United States Patent [19]

Hancock, Jr.

[11] Patent Number: 5,468,435
[45] Date of Patent: Nov. 21, 1995

[54] CONTAMINANT SOLIDIFYING AND STABILIZING APPARATUS AND PROCESS

[75] Inventor: Albert G. Hancock, Jr., Midland, Tex.

[73] Assignee: Texas Incinerator Co., TX, Midland, Tex.

[21] Appl. No.: 240,118

[22] Filed: May 9, 1994

[51] Int. Cl.⁶ ............................................. B29C 39/02
[52] U.S. Cl. ...................... 264/109; 264/333; 425/62; 425/209; 425/256; 588/255; 588/256; 588/257; 588/900
[58] Field of Search ................... 264/109, 333; 425/209, 256, 62, 64; 588/255, 256, 257, 900

[56] References Cited

U.S. PATENT DOCUMENTS

| | | |
|---|---|---|
| 3,837,872 | 9/1974 | Conner . |
| 3,980,558 | 9/1976 | Thomspon . |
| 4,049,462 | 9/1977 | Cocozza . |
| 4,112,033 | 9/1978 | Lingl . |
| 4,149,968 | 4/1979 | Kupiec et al. . |
| 4,160,632 | 7/1979 | Scriminger et al. ................ 425/62 |
| 4,472,198 | 9/1984 | Nowicki et al. . |
| 5,286,430 | 2/1994 | Downs et al. ................ 264/112 |
| 5,302,331 | 4/1994 | Jenkins ................ 264/115 |
| 5,350,549 | 9/1994 | Boyle ................ 264/40.4 |
| 5,377,604 | 1/1995 | Pichat ................ 588/256 |

*Primary Examiner*—Mary Lynn Theisen
*Attorney, Agent, or Firm*—Novak Druce Herrmann Burt

[57] ABSTRACT

A process and apparatus for transforming contaminated material such as liquid wastewaters, into a solid and chemically stable composition which can be utilized as construction material, or which is safe for land disposal. The contaminated material is blended with solidification agents such as cement or lime until substantial amalgamation of the agent and material is completed. The contaminated material is contained within microencapsulation matrices which physically isolate the contaminated material from the environment. The apparatus is transportable and can be brought to the contamination site to transform the contaminated material into the solid and chemically stable composition.

18 Claims, 1 Drawing Sheet

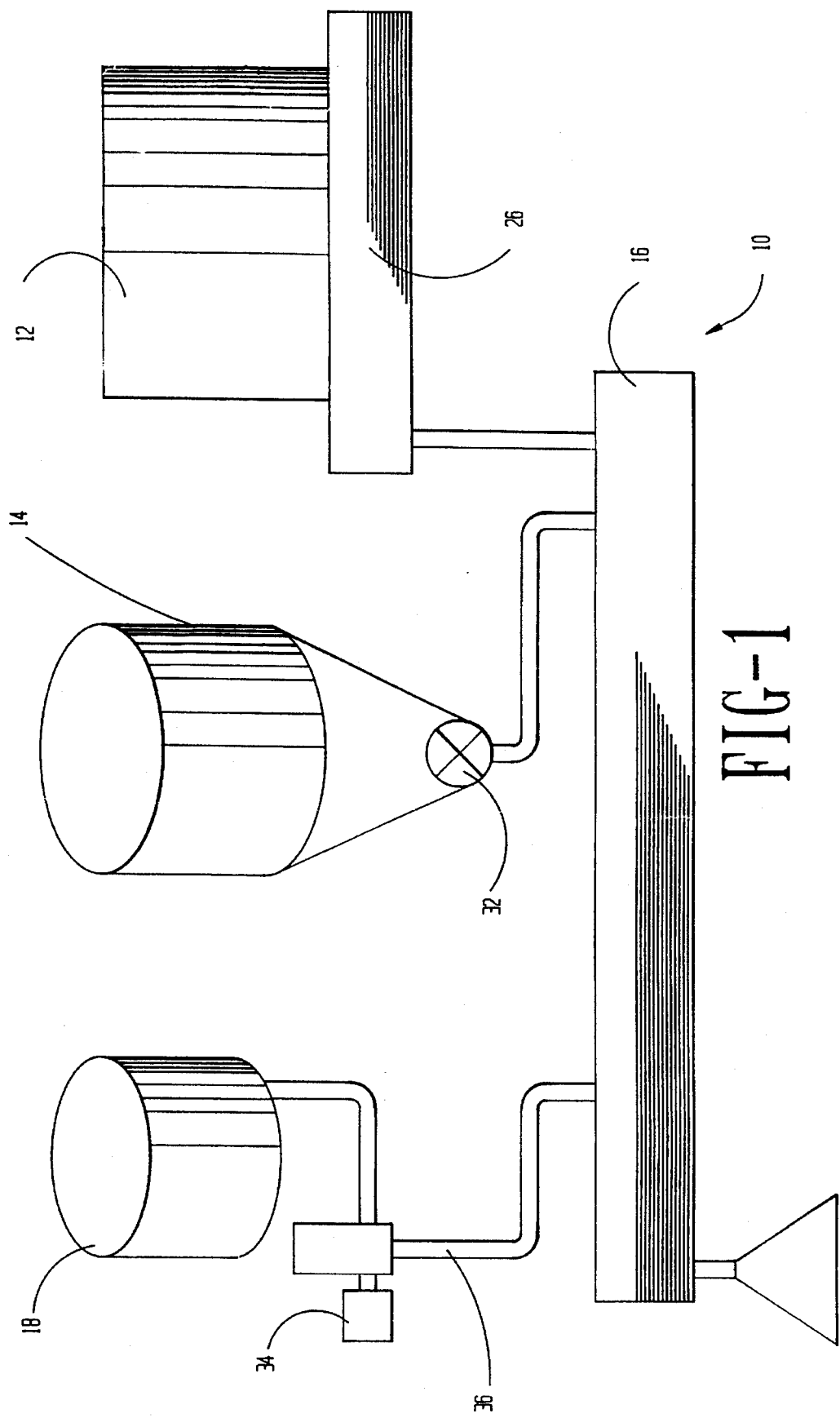

CONTAMINANT SOLIDIFYING AND STABILIZING APPARATUS AND PROCESS

BACKGROUND OF THE INVENTION

1) Field of the Invention

The present invention relates to solidifying and stabilizing contaminants, and more particularly to an apparatus and process for solidifying and stabilizing contaminated soils, sludge, concentrated waste solids, slurries, liquid wastewaters, and the like, into a useful medium.

2) Description of the Related Art

The by-products of our industrialized society, namely contaminated materials, are beginning to pose a serious problem to our environment. Seepage of contaminated liquids into our water supply, unexplained ailments afflicting those living near contaminated waste sites, and soil contamination rendering land parcels unalienable, are just a few of the many serious problems associated with untreated contaminated waste. However, due to public outrage and legislation, gone are the days when contaminated soils and liquids were left untreated, in a hazardous and toxic form.

Today, our society realizes the consequences of leaving contaminated materials untreated and in a hazardous and toxic form. Society has placed concern for the environment and public health, over the economic cost involved in treating and disposing of contaminated material. Industry is required by government regulatory agencies, such as the Environmental Protection Agency, to treat and dispose of contaminated materials within set parameters so as not to further contaminate our environment.

To meet these parameters, the inventive minds of the contaminated waste industry have brought forth several inventions to treat contaminated materials within these parameters. An example of these inventions is Thompson, U.S. Pat. No. 3,980,558 which discloses a method of disposing of sludge contaminated with toxic materials. The Thompson invention entraps the sludge in a rock like solid insoluble in water formed by mixing a gallon of sludge with nine pounds of cement.

Thompson and other similar inventions have enabled the contaminated waste industry to meet the parameters for disposal of contaminated material. However, what is needed is a process which exceeds the parameters set by regulatory agencies and which is efficient, portable and provides a final product which is useful and non-toxic.

SUMMARY OF THE INVENTION

The present invention is a process and apparatus for transforming contaminated material into a solid and chemically stable composition which substantially prevents the leachability of the contaminated material and allows for environmentally safe transportation and land disposal of the contaminated material. The present invention is mobile, and thus can be brought to the contaminated material, preventing the possibility of a transportation accident involving the contaminated material.

The process of transforming contaminated material into a solid and chemically stable composition begins with placing the material into a holding container where it can be released into a mixing chamber at a controlled rate. At the same time the contaminated material is being released into the mixing chamber, a solidification agent is also being added to the mixing chamber at a controlled rate, the rate corresponding to the rate of the release of the contaminated material in order to maximize amalgamation of the agent to the contaminated material. In the mixing chamber, the agent and contaminated material are blended thoroughly in order to form a finished product that will result in the contaminated material being physically isolated from contact with the environment through a collection of inter-connected matrices surrounding the contaminated material, the matrices formed by the reaction of the agent and the contaminated material. Water is added at a predetermined rate to the mixing chamber in order to activate the agent if an insufficient amount of liquid is not present in the contaminated material itself.

Once the mixture of contaminated material, solidification agent, and if necessary, water, is thoroughly blended, the mixture is poured from the mixing chamber into a mold for formation of a solid, chemically stable product that can be utilized as a construction material. If not used as a construction material, the final product may be safely disposed of in a land fill since the final product is within the geotechnical parameters for Class I land disposal set by government regulatory agencies.

Examples of contaminated material include: soils, sludge, concentrated waste solids, slurries and liquid wastewaters, contaminated with, but not limited to, petroleum hydrocarbons and metals. These contaminated material would normally have to be transported to de-contamination site or toxic disposal site. However, the present invention can be brought to the contaminated material rendering unnecessary the hazardous transportation of the contaminated material.

The solidification agents utilized in the present invention include cement, lime and pozzuolan-based agents combined with kiln dust soluble silicates, fly ash, blast furnace slag, flue gas sludge, chemical grouts, thermoplastic agents, organic polymers and polyester resins. These agents when activated by water, and in the presence of the contaminated material, physically isolate the contaminated material from contact with the environment.

The mobil apparatus of the present invention includes a first container, a mixing chamber, a second container, a water tank and a mixer. The first container receives and holds the contaminated material and is connected to the mixing chamber through a flow port which allows for the material to be released into the mixing chamber. A variable feed device connected between the flow port and the container allows for the contaminated material to be released at a predetermined rate.

The second container receives and holds the solidification agent and is connected to the mixing chamber through a flow port which allows for the agent to be released into the mixing chamber. A variable feed device connected between the flow port and the container allows for the agent to be released at a predetermined rate corresponding to the rate of contaminated material entering the mixing chamber.

The water tank receives and holds water and is connected to the mixing chamber through a flow port which allows for the water to be released into the mixing chamber when needed to activate the agent. A metering pump connected between the flow port and the water tank allows for the water to be released when needed, at a predetermined rate corresponding to the rate of agent entering the mixing chamber.

The mixer is located inside the mixing chamber and must be able to thoroughly blend the two reactants, the contaminated material and the solidification agent, so as to have substantial amalgamation of the two reactants. The mixer can be a screw auger, a ribbon mixer, a conical mixer or the like, as long as the mixer is compatible with the agent and can thoroughly blend the two reactants. Once mixing is accomplished, the blended mixture is distributed from the mixing chamber and prepared for drying into a finished product. The blended mixture can be poured into molds which enables the finished product to be utilized as construction material. However the finished product is utilized, the product is in a form that is environmentally safe, and can be transported without fear of an accident occurring while in transport.

The object of the present invention is to provide a simple and safe method for solidifying and chemically stabilizing contaminated material.

A further object of the present invention is to provide a method for easily transforming contaminated material into a product that is useful as a construction material.

A further object of the present invention is to provide a method for transforming contaminated material into a form which is capable of environmentally safe land disposal.

A further object of the present invention is to provide an apparatus that is easy to use and can be implemented in the field without substantial investment in time or resources.

A further object of the present invention is to provide an apparatus that is capable of transforming contaminated material into a product that is useful as a construction material.

A further object of the present invention is to provide an apparatus that is capable of transforming contaminated material into a product that is capable of environmentally safe land disposal.

Other object and advantages will become apparent from the detailed description and the appended claims.

BRIEF DESCRIPTION OF THE DRAWING

The present invention is further described in connection with the accompanying drawing in which:

FIG. 1 is a block diagram of the present invention.

DETAILED DESCRIPTION OF THE INVENTION

Numerous inventions have been brought forth from the inventive minds of the contaminated waste industry concerning the safe disposal of contaminated waste. These inventions for the most part have been directed at encapsulating the contaminated waste within an inert substance for disposal. These invention have not set forth to chemically bind every contaminated waste molecule to a stabilizing agent in order to ensure prevention of leaching of the contaminated waste from the final product.

The present invention is a novel method and apparatus for transforming contaminated material into a solid and chemically stable composition which prevents the leachability of the contaminated material and allows for environmentally safe transportation and land disposal of the contaminated material. The present invention also provides a novel apparatus which is portable, and thus can be brought to the contaminated waste, instead of transporting the waste via public highways to a reclamation site.

What follows is a detailed description of the present invention and examples of the best use of the present invention to transform contaminated material into a solid and chemically stable composition.

There is illustrated in FIG. 1 a block diagram of the apparatus of the present invention. The apparatus 10 consists of a first container 12, a second container 14, a mixing chamber 16, a water tank 18 and a mixer 20, not shown. The first container 12 receives and holds contaminated material. The first container 12 has an aperture 22, not shown, in which the contaminated material is deposited into the container 12. The material is then released into the mixing chamber 16 through a flow port 24, not shown, which is in communication flow between the container 12 and the mixing chamber 16. The rate of release of the material is controlled by a variable feed device 26 which is connected between the flow port 24 and the container 12. The variable feed device 26 allows for a constant controlled flow of contaminated material into the mixing chamber so as to ensure the content of the final product.

The second container 14 receives and holds the solidification agent. The second container 14 has an aperture 28, not shown, in which the agent is deposited into the container 14. The agent is then released into the mixing chamber 16 through a flow port 30, not shown, which is in communication flow between the container 14 and the mixing chamber 16. The rate of release of the agent is controlled by a variable feed device 32 which is connected between the flow port 28 and the container 14. The variable feed device 32 allows for a constant controlled flow of agent into the mixing chamber so as to ensure the content of the final product. The flow of the agent into the mixing chamber 16 corresponds to the rate of release of contaminated material into the mixing chamber 16. The flow of both reactants, the material and the agent, are controlled to provide optimum interaction between the reactants to produce a final product that consists of substantial amalgamation of the material to the agent.

The water tank 18 receives and holds water which is used to activate the agent if the liquid content of the contaminated material is insufficient for activation. The water tank 18 has metering pump 34 which controls the flow of water into the mixing chamber. A flow port 36 connected between the metering pump 34 and the mixing chamber 16 allows for the water to flow into the chamber 16.

Once the agent, material and if necessary water, are in the mixing chamber, they are thoroughly blended in order to have substantial amalgamation. The means for mixing, not shown, can be a screw auger, a ribbon mixer, a conical mixer, or the like, as long as the means for mixing is compatible with the agent.

Once the mixing is completed, the mixture is distributed from the mixing chamber 16 for drying into a final product. The mixture may be poured into molds for use as construction material, or can be dried for land disposal. The final product meets government regulatory agencies' parameters for creep potential, dry density, durability, compressibility and compressive strength for solidified/stabilized waste.

The process of the present invention commences with placing the contaminated material into a holding container. Next, the material is released at a controlled rate into a mixing chamber. Then a first solidification agent is added to the mixing chamber in order to mix with the contaminated material. The agent and contaminated material form a mixture which is poured from the chamber and dried. If the liquid content of the waste is insufficient to activate the agent, water is added to the chamber at a controlled rate in order to activate the agent. For some material, a second solidification agent is added to the mixture along with the first solidification agent in order to have substantial amalgamation of the agents and material.

The contaminated material transformed by the present invention includes sludge, concentrated waste solids, slurries, liquid wastewaters and contaminated soils. The solidification agents used in the present invention are cement, lime and puozzloan based agents which may be combined with the flowing: kiln dust; soluble silicates; fly ash; blast furnace slag; flues gas sludge; chemical grouts, thermoplastic agents; organic polymers; and polyester resins.

The final product produced through the present invention limits the mobility of the contaminated material, reduces the leachability, and makes land disposal a viable treatment option. Additionally, the final product is a transportable solid with reduced hazard to the environment.

The present invention will be further described in the following examples, however, the scope of the present invention is not to be limited by these examples.

EXAMPLE 1

In this example, a soil contaminated with water soluble chlorides at 83,680 parts per million (hereinafter ppm) was treated with the process of the present invention. A ten kilogram portion of the contaminated material was placed in a holding container. The contaminated material was released at a rate of one thousand grams per minute, into a mixing chamber. Concurrently, a solidification agent consisting of waste Portland Cement was released into the mixing chamber at rate of one hundred thirty two grams per minute. The contaminated material and the agent were blended for one minute and then tested for contamination levels. After the treatment, the level of contamination was reduced to 106 ppm of water soluble chlorides.

EXAMPLE 2

In this example, a soil contaminated with mercury at 7.60 ppm was treated with the process of the present invention. A ten kilogram portion of the contaminated material was placed in a holding container. The contaminated material was released at a rate of one thousand grams per minute, into a mixing chamber. Concurrently, a solidification agent consisting of waste Portland Cement was released into the mixing chamber at rate of two hundred grams per minute. The contaminated material and the agents were blended for one minute and then tested for contamination levels. After the treatment, the level of contamination was reduced to 0.20 ppm of mercury.

EXAMPLE 3

In this example, a soil contaminated with petroleum hydrocarbons at 1220 ppm was treated with the process of the present invention. A ten kilogram portion of the contaminated material was placed in a holding container. The contaminated material was released at a rate of one thousand grams per minute, into a mixing chamber. Concurrently, a solidification agent consisting of waste Portland Cement was released into the mixing chamber at rate of four hundred grams per minute. The contaminated material and the agents were blended for one minute and then tested for contamination levels. After the treatment, the level of contamination was reduced to 65 ppm of total hydrocarbons.

While preferred embodiments of the invention have been shown and described, it will be apparent to those skilled in this art that various modifications may be made in these embodiments without departing from the spirit of the present invention. Therefore, the embodiments of the invention in which an exclusive property or privilege is claimed are defined as follows:

What is claimed is:

1. A process for transforming contaminated materials into a solid and stable composition which substantially prevents the leachability of the contaminated material and allows for environmentally safe transportation and land disposal of the contaminated material comprising the steps of:

placing a contaminated material into a holding container, said holding container in communication flow with a mixing chamber through a flow port;

releasing said contaminated material into said mixing chamber at a predetermined rate;

adding a first solidification agent to said mixing chamber at a predetermined rate corresponding proportionally to said predetermined rate of said contaminated material;

mixing said contaminated material and said first solidification agent, said mixing resulting in a mixture where there is substantial amalgamation of said first agent and said contaminated material;

pouring said mixture at a predetermined rate from said mixing chamber into a mold; and drying of said mixture in said mold for creation of a solid, chemically stable product;

whereby said product is a collection of inter-connected matrices in which said contaminated material is physically isolated from contact with the environment, thereby providing a means for safely transporting said product from a contamination site to a disposal site, and allowing for said product to be utilized as a construction material.

2. The process according to claim 1 further comprising the step of activating said first solidification agent with water, the activating allowing for said first solidification agent to react with said contaminated material.

3. The process according to claim 1 further comprising the step of adding water to said mixing chamber at a predetermined rate in order to activate said first solidification agent.

4. The process according to claim 1 wherein said contaminated material is selected from the group consisting of sludge, concentrated waste solids, slurries, liquid wastewaters and contaminated soils.

5. The process according to claim 1 wherein said contaminated material is contaminated with a substance selected from the group consisting of mercury, chlorides and petroleum hydrocarbons.

6. The process according to claim 1 wherein said process is self contained substantially preventing physical contact of said contaminated material with the environment.

7. The process according to claim 1 wherein said first solidification agent is a substance selected from the group consisting of cement, lime and pozzuolan-based reactants.

8. The process according to claim 7 wherein a second solidification agent is added to said mixture with said first solidification agent, the second solidification agent selected from the group consisting of kiln dust, soluble silicates and fly ash.

9. A transportable apparatus for transforming contaminated materials into a solid and stable composition which substantially prevents the leachability of the contaminated material and allows for environmentally safe transportation and land disposal of the contaminated material comprising:

a first container for receiving and holding contaminated material, the first container composed of a solid material that will not react with the contaminated material, the first container having a first aperture on the top for receiving the contaminated material therethrough, and a second aperture at the bottom for releasing the contaminated material;

a mixing chamber for receiving contaminated material from said first container, composed of a solid material that will not react with contaminated material, the mixing chamber in communication flow with said first container through a first flow port located at the top of the mixing chamber and at the bottom of said first container, contaminated material released through said second aperture, thorough the first flow port and into the mixing chamber;

a first variable feed device for controlling the release of contaminated material into said mixing chamber, the first variable feed device located between said first flow port and said first container, the first variable device releasing contaminated material at a predetermined rate;

a second container for receiving and holding solidification agent, the second container composed of a solid material unreactive to the solidification agent, the second container having a top aperture for receiving the solidification agent and a bottom aperture for releasing the solidification agent into said mixing chamber, the second container in communication flow with said mixing chamber through a second flow port;

a second variable feed device for controlling the release of solidification agent into said mixing chamber, the second variable feed device connected between said second container and said second flow port, the second variable feed device releasing solidification agent at a predetermined rate proportional to the release of contaminated material;

a water tank for receiving and holding water, the water tank in communication flow with said mixing chamber through a third flow port, the water tank having a metering pump for controlling the release of water into said mixing chamber, the metering pump connected between the water tank and the third flow port;

means for blending contaminated material, solidification agent and water in said mixing chamber so as to have substantial amalgamation of solidification agent and contaminated material thereby creating a mixture of solidification agent and contaminated material; and means for releasing the mixture from said mixing chamber into a mold for drying of the mixture into a finished product; whereby contaminated material and solidification agent are released into said mixing chamber at a rate allowing for substantial amalgamation through the blending, water added to said chamber as needed to activate solidification agent, the final product being a collection of interconnected matrices in which said contaminated material is physically isolated from contact with the environment, thereby providing a means for safely transporting said product from a contamination site to a disposal site, and allowing for said product to be utilized as a construction material.

10. The transportable apparatus according to claim 9 wherein said means for blending is a screw auger.

11. The transportable apparatus according to claim 9 wherein said means for blending is a rotary drum mixer.

12. A process for transforming contaminated materials into a solid and stable composition which substantially prevents the leachability of the contaminated material and allows for environmentally safe transportation and land disposal of the contaminated material, the process performed at a contamination site, the process comprising the steps of:

placing contaminated material into a holding container, said holding container in communication flow with a mixing chamber through a flow port;

releasing said contaminated material into said mixing chamber at a predetermined rate;

adding a first solidification agent to said mixing chamber at a predetermined rate corresponding proportionally to said predetermined rate of said contaminated material;

mixing said contaminated material and said first solidification agent, said mixing resulting in a mixture where there is substantial amalgamation of said first agent and said contaminated material;

pouring said mixture at a predetermined rate from said mixing chamber into a mold; and drying of said mixture in said mold for creation of a solid, chemically stable product;

whereby said product is a collection of inter-connected matrices in which said contaminated material is physically isolated from contact with the environment, thereby providing a means for safely transporting said product from a contamination site to a disposal site, and allowing for said product to be utilized as a construction material.

13. The process according to claim 12 further comprising the step of activating said first solidification agent with water, the activating allowing for said first solidification agent to react with said contaminated material.

14. The process according to claim 12 further comprising the step of adding water to said mixing chamber at a predetermined rate in order to activate said first solidification agent.

15. The process according to claim 12 wherein said contaminated material is selected from the group consisting of sludge, concentrated waste solids, slurries, liquid wastewaters and contaminated soils.

16. The process according to claim 12 wherein said contaminated material is contaminated with a substance selected from the group consisting of mercury, chlorides and petroleum hydrocarbons.

17. The process according to claim 12 wherein said first solidification agent is a substance selected from the group consisting of cement, lime and pozzuolan-based reactants.

18. The process according to claim 12 wherein a second solidification agent is added to said mixture with said first solidification agent, the second solidification agent selected from the group consisting of kiln dust, soluble silicates and fly ash.

* * * * *